United States Patent [19]

Cooper

[11] Patent Number: 4,816,830
[45] Date of Patent: Mar. 28, 1989

[54] WAVEFORM SHAPING APPARATUS AND METHOD

[76] Inventor: James C. Cooper, 1373 Sydney Dr., Sunnyvale, Calif. 94087

[21] Appl. No.: 95,683

[22] Filed: Sep. 14, 1987

[51] Int. Cl.[4] .............................................. H03M 1/76
[52] U.S. Cl. .................................... 341/153; 341/144; 341/154; 341/148
[58] Field of Search .... 340/347 DA, 347 M, 347 SH; 328/14; 364/851, 178, 179; 377/54; 341/144, 148, 153, 154

[56] References Cited

U.S. PATENT DOCUMENTS

| | | | |
|---|---|---|---|
| 3,648,102 | 3/1972 | Bettin | 377/54 X |
| 3,838,414 | 9/1974 | Wiles | 340/347 DA |
| 4,061,909 | 12/1977 | Bryant | 340/347 DA X |
| 4,443,766 | 4/1984 | Belton, Jr. | 328/151 |
| 4,524,423 | 6/1985 | Acampora | 364/724 |
| 4,607,241 | 8/1986 | Horowitz et al. | 333/166 |

*Primary Examiner*—Vit W. Miska
*Assistant Examiner*—Brian K. Young

[57] ABSTRACT

An apparatus and method for generating or shaping the waveform of electronic signals thereby controlling the high frequency energy content of transitions thereof and in particular for imparting a sine squared shape to synchronizing pulses utilized in television systems is shown.

19 Claims, 2 Drawing Sheets

WAVEFORM SHAPING APPARATUS AND METHOD

BACKGROUND OF THE INVENTION

1. Field of the Invention

In many areas of electronic signal generation and signal processing, it is desirable to either make electronic signals of a particular wave shape, or to filter electronic signals to force them to acquire a given wave shape for a given input wave shape. The waveshaping of electronic signals is equivalent to attenuation and time displacement of various frequency bands of said signals. Of particular interest for many applications are the generation of pulses whose edges take on a sine squared shape, in order that the high frequency energy of these pulses is limited so as not to exceed a given frequency. The analysis of filters to perform such sine squared shaping has been investigated and reported: W. E. Thompson "The Synthesis of a Network to have a Sine Squared Impulse Response", Proc. IEE (London) Vol. 99, Part III p. 373, 1952; E. A. Guillemin "Synthesis of Passive Networks", New York, Wiley, 1957; and Arend Kastelein "A New Sine-Squared Pulse and Bar Shaping Network", IEEE Transactions on Broadcasting, Vol. BC-16, No. 4, Dec. 1970. Particular attention is given by the latter to shaping of synchronizing pusles for the television industry.

2. Description of the Prior Art

The shaping of electronic waveforms is generally accomplished by filters, both analog and digital, and in some applications, waveforms are generated by digital devices and converted to analog. Of these methods, the analog LC filter is the most common, requiring inductors and capacitors as circuit components. Generally for a reasonable level of performance for sine squared applications, 7-9 variable inductors and 7-9 capacitors, all having a tolerance in the 1 percent range, are required. These filters are fairly expensive and difficult to align properly, making their use somewhat limited, especially in lower cost equipment. For the television industry, and in particular the NTSC broadcast industry of the United States, it is generally accepted that the synchronizing pulses of video signals should have a sine squared shape with a 10% to 90% rise/fall time of 140 ns±20 ns. This will ensure that all of the energy of the pulses is contained below the 4.2 Mhz bandwidth normally occupied by the video signal. The shaping of these synchronizing pulses is generally achieved by utilizing analog LC filters in more expensive equipment, or in lower cost equipment the pulses are given a trapezoidal shape to approximate a sine squared shape, but at a reduced level of conformity (and performance) to the generally accepted standard.

SUMMARY OF THE INVENTION

The waveform shaping apparatus and method described herein provides a simple low cost method of controlling the waveshape of electronic signals. The preferred embodiment shows a low cost yet high performance invention capable of providing synchronizing pulses which have edges which closely approximate a sine squared shape and have controlled rise and fall times which may be used in television and other devices. The present invention may be utilized to provide filtering, for example low pass filtering, without the phase distortion i.e. ringing, common to normal L.C. filters. A second embodiment of the invention is shown which achieves better performance at the cost of increased complexity. Other inventive characteristics of the invention include simplicity of selection of component values, immunity of performance degradation to component and temperature variations, and little or no alignment. Other objects and a fuller understanding of this invention may be had by referring to the following description and claims, taken in conjunction with the accompanying drawings.

DESCRIPTION OF THE PREFERRED EMBODIMENT

Figure 1:
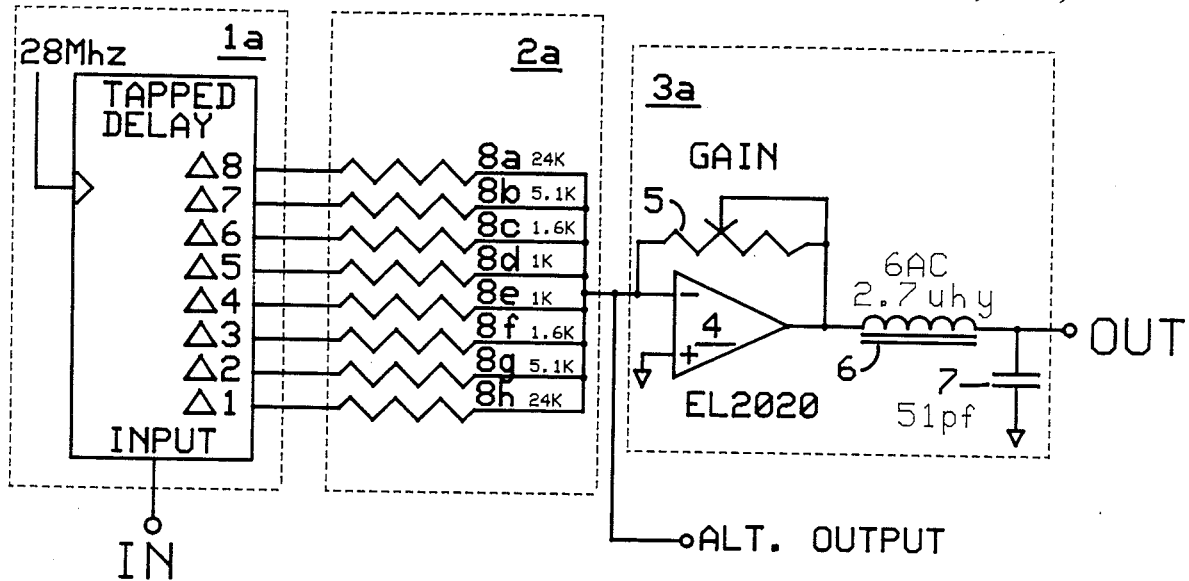
FIG. 1 shows a schematic diagram of the preferred embodiment of the invention.

FIG. 1 shows a schematic diagram of the preferred embodiment of the invention, with typical component values shown by way of example, suitable for generating an 8 volt negative pulse having close approximation to sine squared shaped edges and having a 140 nanosecond rise/fall time as measured at the 10 and 90% points. The output of this circuit may be source terminated in 75 ohms for applying the pulse directly to a coaxial cable connector as is commonly done in the industry. The invention consists of a delay means 1a having an input and a multiple number of time delay outputs (or taps) Δ1 thru Δ8. A typical I.C. for use in delaying pulses as shown here is a 74HCT164, which would receive an input TTL level pulse and an input 28 MHz TTL clock. An LC or other type of pulse or linear delay line could be used as well, and the circuit can be utilized for shaping pulses utilizing pulse compatible delays such as the aforementioned I.C., or for shaping analog signals utilizing linear delays. FIG. 1 also shows a weighting means 2a having a multiple number of inputs, each of which is coupled to a delay means output, shown by way of example as a bank of 8 resistors 8a thru 8h, having one end of each resistor coupled in common to form an output thereby outputting a weighted output signal and the other end of each resistor coupled respectively to each output of the delay means. Suggested 5% resistor values of 24K, 5.1K, 1.6K, 1K, 1K, 1.6K, 5.1K and 24K are shown for 8a thru 8h respectively, also, values of 26.7K, 2.43K, 1.27K, 1.0K, 1.0K, 1.27K, 2.43K and 26.7K are satisfactory if the additional expense of 1% resistors is acceptable. FIG. 1 further shows a filter means 3a coupled to the output of the weighting means 2a for filtering the output signal thereof and providing an output signal, which filter means contains an amplifier comprised of amplifier 4 and variable resistor 5 and a simple LC low pass filter comprised of inductor 6 and capacitor 7. The amplifier 4 for example, may be of the Elantec EL2020 type as indicated. As will be described later, the filter means 3a may not be necessary, or may be located elsewhere, in which case the output is taken at the point shown as alternate output.

An input TTL signal, in the present example for use with NTSC television, a positive TTL sync pulse of 4.7 μs in width is applied at the input of the delay means 1a. The pulse is delayed by 1a and made available at each output of the delay means at successive time intervals, in this example at the clock period of the 28 Mhz clock applied to the suggested 74HCT164 IC. Each output of the delay means is coupled to the output of the weighting means 2 through one of the weighting resistors 8a thru 8h. Each resistor forms a weighted delay signal which is a percentage of that delayed signal, and the output of the weighting means is therefore the combination of the weighted delay signals from the weighting resistors. The output of the weighting means is coupled to the filter means where it is filtered to remove unwanted disturbances arising from the discrete outputs of the delay means, which in the present example is a 28 Mhz component of energy arising because the delay means has outputs spaced at 35 nanoseconds.

In the single delay means embodiment of the invention, such as described by way of example of FIG. 1, the delay outputs are configured such that the delay period is related to the desired transition time of the signal output from the invention. In the present example (refer to FIG. 2), the desired rise/fall time is 140 ns (measured from the 10% to 90% points), with the entire transition (0% to 100%) occurring over a 245 ns period. The total length of the delay is then chosen to be 245 ns. Since 8 taps are utilized, the tap to tap delay is therefore 35 ns. The number of taps may vary, and accordingly the delay time from tap to tap, however it will be understood from the present teachings, that for embodiments such as that of FIG. 1, that the total delay time from the least delayed output signal (or tap) to the most delayed output signal should correspond to the desired transition time of the output waveform of the invention. It should be noted that this total delay time will not always exactly correspond to the desired transition time, due to such factors as stray capacitance, and the effects of the filter means which can lengthen or shorten the transition time with respect to the delay time by a small percentage, however in general, the relative delay between the least delayed and most delayed signals provided to the summing means will be close to the 0 to 100 percent transition time of the output signal.

Figure 2:
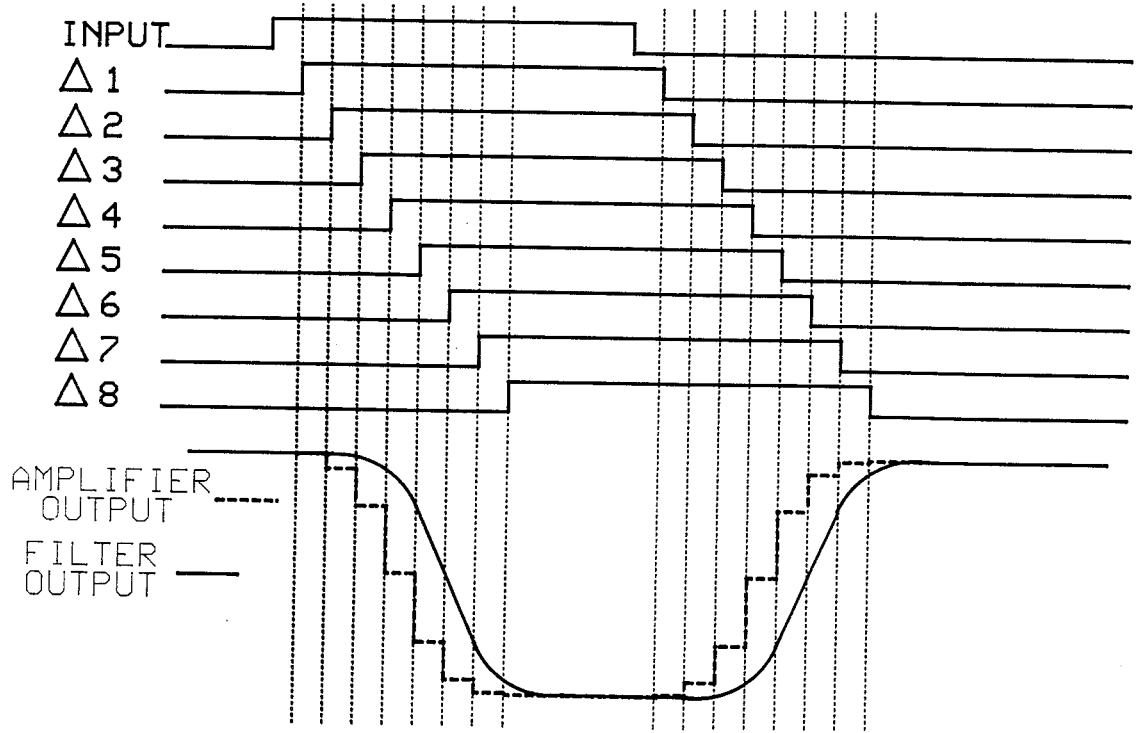
FIG. 2 shows typical waveforms which may be related to FIG. 1 in understanding the operation of the invention shown in preferred form.

Referring to FIG. 2, which contains typical waveforms which reflect the signals present at points in FIG. 1, a typical input sync pulse labeled input is seen at the top. The time delayed outputs of the delay means are shown as waveforms Δ1 thru Δ8 corresponding to the same named outputs of 1a. A typical waveform which might be seen at the output of amplifier 4 is also shown as the dashed line in FIG. 2 (assuming a perfect amplifier), and the output of the filter means 3a is shown as a solid line superimposed over the dashed line with an exaggerated time delay for clarity.

By inspecting the dashed amplifier output waveform of FIG. 2, it can be seen that it is made of discrete steps, which correspond time wise to the outputs of the delay means 1a. The amplitude of the step, i.e. its change in amplitude from the previous step is a function of the current injected into the amplifier as a result of current flowing through the corresponding resistor of the summing means. The step function in this signal gives rise to the need for the simple low pass filter made up of 6 and 7, whose function is to remove the energy at the step frequency, in this example 28 Mhz, thus smoothing the transition between steps. Alternately, this low pass filter means 3 may take on a number of well known forms since its primary function is to remove the step frequency energy. Since the step frequency energy is considerably higher than the signal frequency, the design of the filter is fairly simple. It has been found that a six aperture ferrite choke (6AC) such as a South American Development Corp. Model SA800 works well for inductor 6. This device is in effect a high frequency dissipater. The reason the 6AC works well in this function is that the ferrite core dissipates high frequency energy as heat, thus greatly reducing or eliminating ringing in the circuit of 6 and 7. This is considered one of the inventive features of the embodiment. A dipped mica type capacitor works well for component 7.

It will be recognized by one skilled in the art that the filter means may be eliminated entirely, since the stepped waveform output from the weighting means is a good approximation to the wanted wave shape, and the removal of step frequency energy may take place in equipment which receives the signal output from the invention, or if utilized to drive a long coaxial cable, the step frequency energy may be attenuated by the cable. In this instance, the output may be taken from the point labeled Alt. Output. It should be noted that the resistor values will change since the circuit will be driving a load impedance rater than a virtual ground node. It will be understood by one skilled in the art that the reference to the filter means, both in this disclosure and the claims is meant to refer to the reduction in step frequency energy and that this reduction may be performed by devices or methods not directly attached to the weighting means, or may not take place to a significant amount, if the step frequency energy is high enough in frequency or low enough in quantity to make it negligible with respect to the signal frequency. The latter case is particularly relevant if a large number of delay outputs are utilized.

The particular circuit components shown in the preferred embodiment of FIG. 1 operate together to achieve a high degree of performance at a low cost. This is enhanced because the 74HCT164 and EL2020 perform additional functions in addition to their basic function. The 74HCT164 operates as a clocked delay to provide a stable accurate delay period at each output. The 35 ns period, which requires a 28 Mhz clock, is chosen because it is a submultiple of the 140 ns rise/fall time specification for NTSC signals, and also because it is 8 times the standard 3.58 Mhz color subcarrier frequency, thus when operating with NTSC video equipment the 28 Mhz clock is easy to derive. Having the delay period correspond to a submultiple of the pulse period is a valuable feature of this embodiment and should be clearly noted. The value of this feature includes the fact that all of the step energy components will be at multiples of the pulse waveform frequency and thus will not be as prone to generating beat frequency components when added to the pulse waveform as would nonrelated energy components. The suggested HCT family of I.C.'s are characterized by a high degree of stability and low noise on the outputs, matched rise and fall times, as well as having output levels which are very close to the supply voltages, for example +5V and ground. By configuring the EL2020 amplifier 4 in the inverting gain mode, a current source is effected by each resistor in 2a. Since the outputs of the HCT 164 are clean and stable, the current will be clean and stable. The input of the EL2020 is held at ground under all signal conditions due to the nature of the inverting amplifier circuit chosen, thus making the calculation of the resistance value to give a wanted voltage step at the output of the EL2020 simple. The values shown allow adjustment of variable resistor 5 to give a negative eight volt pulse, which fits the NTSC standards for 4 volts source terminated into a coaxial cable, if adjustment is not desired this resistor can be fixed.

It is envisioned that this embodiment of the invention would work well for limiting the rise time of active video signals as well as sync pulses. Limiting and shaping the edges of electronically generated characters and graphics would be a valuable use of this invention.

Using this preferred embodiment, arbitrary waveforms may be created by dividing the waveforms into a number of steps (the steps do not need to be symmetrically or repetitively positioned), providing a delay tap and resistor for each step, and calculating the proper resistor value to achieve the wanted voltage change to that step from the past step. If necessary a filter such as 6 and 7 can be added to smooth the waveform between the steps. The invention may also be utilized to generate repetitive waveforms. For example, a complex wave shape may be generated in a repetitive pattern by applying a repetitive input to the delay means 1a. By way of example, a particularly useful configuration would apply a repetitive pulse with a 50% duty cycle having a period equal to twice the total length of the delay means. The weighting means 2a would be configured to provide a sinusaidal response, thereby providing a continuous sinewave output. By making the delay means a clocked device, such as by utilizing a digital shift register, and generating the input pulse by dividing the clock which is applied to the shift register, a low cost but stable sine wave generator is created out of the invention. By further providing a variable frequency clock source, a variable frequency sine wave generator is effected. Other variable frequency repetitive waveforms may also be generated.

The amplifier 4 may serve a secondary function in that it may operate to remove step frequency energy as a result of limited slew rate and limited bandwidth. In the present EL2020 example bandwidth is approximately 30 Mhz giving some attenuation. One skilled in the art will recognize that the amplifier 4 could be replaced by a standard operational amplifier such as Elantec EL5195 configured as a low pass filter or as a notch reject filter, thus eliminating the need for 6 and 7. Information on building such filters, as well as calculating the resistance values to provide the proper current for a given voltage output step is available in applications literature for operational amplifiers and is provided by several I.C. manufacturers such as Elantec and National Semiconductor.

Figure 3:
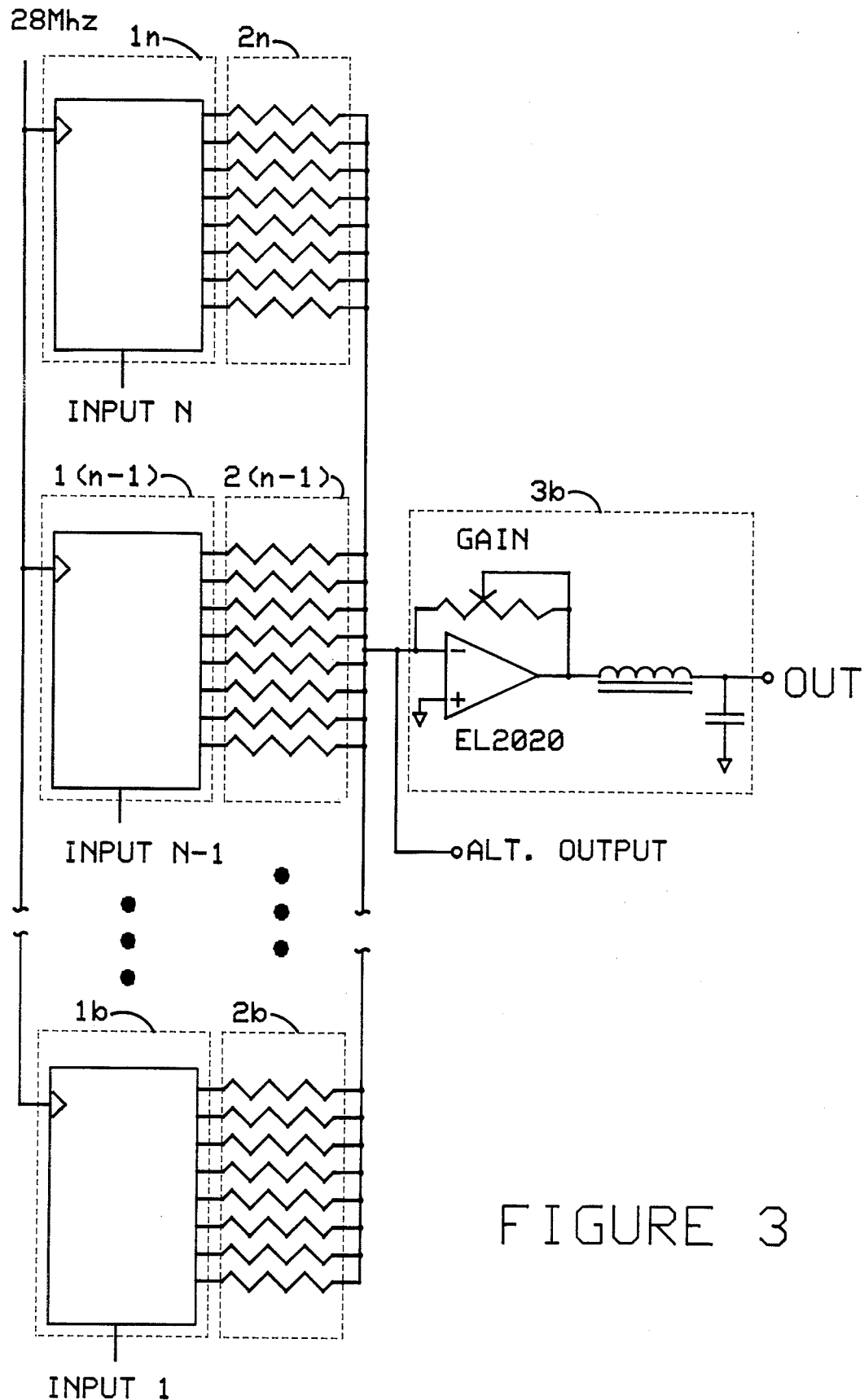
FIG. 3 shows a more complex version of the invention.

FIG. 3 shows multiple number of delay means and weighting means may be combined with a filter means to allow the generation of waveforms of multiple steady state amplitudes, or to create a digital to analog convertor which in effect has an internal reconstruction filter. The latter function will find great usefulness in applications requiring a good fidelity reconstruction of a digitized signal, such as in television and digital audio applications.

Referring to FIG. 3, a N bit wide embodiment of the present invention is shown. It consists on N multiples of the delay and weighting means 1a and 2a of FIG. 1 which are labeled as 1b thru 1n and 2b thru 2n respectively, all having their outputs connected in common and supplying a signal to filter means 3b the same as 3a for FIG. 1, thus making a larger delay means having multiple inputs and a larger weighting means. One skilled in the art will recognize that the weighting means 2b thru 2n may each be weighted, for example in binary powers, in order that the input to each weighting means has a weighted effect on the output of the filter means 3b. If each weighting means is chosen to provide a sinusoidal or other linear phase response, then the circuit in effect becomes a D-A Convertor having a linear phase reconstruction filter built in. By utilizing a large number of delay taps, for example 16, a very good pass band to stop band ratio can be achieved, without the ringing and phase distortion normally found in L.C. type filters, and at a much lower cost. This characteristic is very important in a number of applications. Of course, since the net frequency domain response of the D-A and reconstruction filter may not be flat, an equalizing circuit connected to the output to amplify the high frequency components of the output signal relative to the low frequency components will be desirable. The shape of the equalizing circuit frequency response will of course complement the shape of the D-A and reconstruction filter response as is well known in the art.

In the embodiment of FIG. 3 of the invention, the delay period is chosen to be uniform and a submultiple of the digital data clock period, for example $\frac{1}{4}$. For a standard video signal sample frequency of 14.3 Mhz the delay period would be 17.5 ns. This period is easy to achieve by clocking the suggested 74HCT164 I.C. with a 57 Mhz clock (14.3×4). Of course a better filtering job can be accomplished with more than the suggested 8 delay outputs and/or smaller delay spacing, but at added cost and complexity.

The suggested components shown in the present embodiments were chosen because of their good cost to performance ratio. It would of course be possible to substitute different circuits or components to perform essentially the same function. For example, the 74HCT164 I.C. can be replaced by a number of different I.C.'s or by delay lines. The weighting network which contains resistors, could also be accomplished with switched current sources, current mirrors, charge transfer devices such as sample and hold or bucket brigade circuits, or other well known circuits. Both positive and negative current sources may be utilized, separately or intermixed. Such intermixed current sources, or weighting, will enable more complex step response having both positive and negative values, thus providing ringing, or preshoot and overshoot. The intermixing of positive and negative weighting can therefore give much better frequency response characteristics in terms of pass band to stop band ratios, and better rejection characteristics. The filter means 3 can be eliminated, or replaced by any of a number of circuits, as previously discussed.

Although this invention has been described in its preferred form with a certain degree of particularity, it is understood that the present disclosure of the preferred form has been made only by way of example and that numerous changes in the details of construction and the combination and arrangement of parts as well as combination of functions, methods or means with other functions, means, methods or devices may be resorted to without departing from the spirit and scope of the invention as hereinafter claimed.

What is claimed is:

1. Apparatus for providing shaping of an electronic signal including in combination; delay means for delaying said electronic signal which delay means has a delay input for receiving said electronic signal and a plurality of delay outputs for outputting versions of said electronic signal with said versions including a first version and a plurality of other versions having relative delays with respect to said first version, and a weighting means having a weighted output and a plurality of weighting inputs, with one of said weighting inputs responsive to each of said delay outputs to generate a weighted delay signal which is a percentage of each said version said weighting means operating to output a shaped signal from said weighted output in response to a combination of all of said, versions with said delay means calibrated such that the delay time of the most delayed of said other versions of said electronic signal with respect to said first version of said electronic signal corresponds to the transition time of said output shaped signal.

2. Apparatus of claim 1 including a plurality of delay means each responsive to an electronic signal wherein said weighting means is responsive to said plurality of delay means.

3. Apparatus of claim 1 wherein said delay means has a plurality of inputs and outputs a plurality of delayed versions of electronic signals provided at the plurality of inputs.

4. Apparatus of claim 3, 2, or 1 including filter means responsive to the output of said weighting means to filter said shaped signal.

5. Apparatus of claim 3, 2, or 1 including filter means responsive to the output of said weighting means to filter said shaped signal, wherein the characteristics of said filter means are chosen so as to attenuate energy in said shaped signal which energy occurs at the period of said outputs of said delay means.

6. Apparatus for changing some of the energy of transitions of an input electronic signal including in combination; delay means having an input coupled to said signal and having a plurality of delay outputs providing delay signals, with the delay time corresponding to the difference between the shortest and the longest delayed of said delay signals being an amount corresponding to the transition time of the signal output from said apparatus, a weighting means to provide a weighted signal and having a plurality of inputs, one of which is coupled to each of said delay means outputs, each of said weighting means inputs operative to contribute a fixed portion of each of said delay signals to generate said weighted signal in response to said delay signals, and filter means responsive to said weighting means to smooth said weighted signal to produce said output signal.

7. Apparatus for generating a filtered analog electronic signal comprising a delay means responsive to a digital input signal and having delay outputs providing a plurality of delayed versions thereof, said delay means operative to provide one of said versions delayed by an amount less than the smallest period of said input signal, weighting means responsive to said delayed versions and providing a weighted signal wherein the value of said weighted signal is determined according to the values of all of said delayed versions, and a filter means operative to smooth said weighted signal to provide said filtered analog electronic signal.

8. Apparatus for converting a digital made up of a plurality significance signals to an analog signal said apparatus comprising a plurality of delay means, one of which is responsive to each of said significance signals and having delay outputs to provide a plurality of delayed versions thereof, a weighting means responsive to said delayed versions output from said plurality of delay means for providing a weighted signal wherein the value of said weighted signal is determined in response to the values of said delayed versions, and filter means operative to smooth said weighted signal to provide said analog signal.

9. Apparatus for generating a shaped version of a digital pulse comprising; a tapped digital delay means coupled to receive said pulse and having a plurality of digital outputs for providing a first digital versions and a plurality of delayed digital versions of said digital pulse said delayed digital versions being delayed by less than the duration of said pulse, with respect to said first digital version, a weighting means providing a weighted signal and having a plurality of current generators each of which is responsive to one of said digital versions of said digital pulse, said weighted signal being responsive to all of said current generators such that the value of said weighted signal is determined in response to the values of all of said digital versions, and a filter means responsive to said weighted signal to smooth changes resultant from changing digital versions to provide said shaped version of said digital pulse.

10. Apparatus as claimed in claim 1, 6, 7, 8 or 9 wherein said delay means compromises at least one clocked digital shift register.

11. Apparatus as claimed in claim 1, 6, 7, 8 or 9 wherein said weighting means comprises resistors in which one end of each resistor is coupled to one of said delay outputs and with the other ends of said resistors coupled in common.

12. Apparatus as claimed in claim 6, 7, 8 or 9 wherein said filter means includes a high frequency dissipater operative to dissipate part of the high frequency energy of said weighted signal.

13. The method of filtering an electronic signal including the steps of delaying said signal by less than the period of said signal to provide a plurality of delayed versions of said signal, the step of generating an analog portion signal in response to each of said delayed versions of said signal having an analog value responsive thereto and the step of combining all of said portion signals and the step of generating a weighted signal in response to the aforementioned combination which is a filtered version of said electronic signal.

14. The method of claim 13 comprising the further step of filtering said weighted signal to provide a smoothed filtered version of said electronic signal.

15. The method of claim 13 wherein said delaying step is accomplished by delaying said electronic signal in a digital shift register which is clocked with a clock derived from the device which generates said electronic signal.

16. Apparatus for shaping the edges of an electronic signal comprising binary pulses, including in combination; a tapped delay to delay said pulses by less than the period thereof and provide a plurality of delayed version thereof, a weighting means responsive to said delayed versions and providing an output signal wherein the value of said output signal is responsive to the values of all of said delayed versions, which output signal is the input electronic signal with shaped edges.

17. Apparatus as claimed in claim 1, 6, 7, 8, 9 or 16 wherein said electronic signal is a television synchronizing signal, wih he shaped edges of the shaped signal having a shape which is monotonic and is rounded.

18. Apparatus as claimed in claim 1, 6, 7, 8, 9 or 16 wherein the shaped edges of the shaped signal have a shape modeled after a sine squared shape.

19. Apparatus as claimed in claim 1, 6, 7, 8, 9 or 16 wherein said delay is a clocked delay wherein the clock is responsive to the signal input to said delay.

* * * * *